July 15, 1924.
R. C. BENNER ET AL
1,501,091
WATER ACTIVATED RESERVE CELL
Filed June 12, 1922
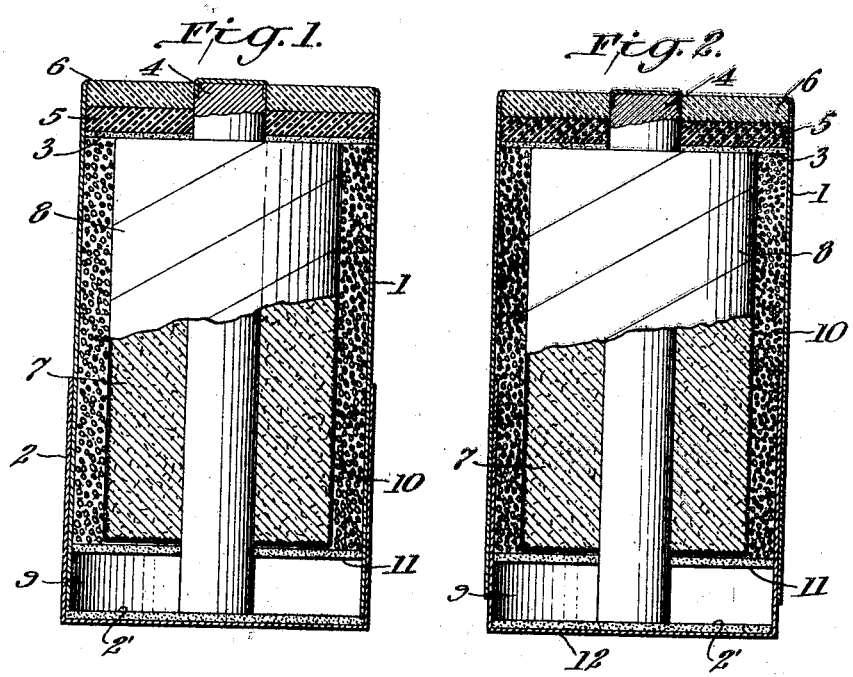
Inventors:
Raymond C. Benner,
Harry H. Thompson,
by Byrnes, Townsend & Brickenstein,
Attorneys.

Patented July 15, 1924.

1,501,091

UNITED STATES PATENT OFFICE.

RAYMOND C. BENNER, OF BAYSIDE, AND HARRY H. THOMPSON, OF FLUSHING, NEW YORK, ASSIGNORS, BY MESNE ASSIGNMENTS, TO NATIONAL CARBON COMPANY, INC., OF NEW YORK, N. Y., A CORPORATION OF NEW YORK.

WATER-ACTIVATED RESERVE CELL.

Application filed June 12, 1922. Serial No. 567,736.

*To all whom it may concern:*

Be it known that we, RAYMOND C. BENNER and HARRY H. THOMPSON, citizens of the United States, residing at Bayside and Flushing, respectively, in the county of Queens and State of New York, have invented certain new and useful Improvements in Water-Activated Reserve Cells, of which the following is a specification.

This invention relates to deferred action cells of the type adapted to be activated by addition of water or electrolyte solution. A particular object of the invention is to improve the construction of cells of this type, thereby simplifying the activating procedure and insuring a rapid rise to full current production.

Deferred action cells containing no moisture do not deteriorate on shelf and have the important advantage that they require no special sealing means for preventing evaporation, such as must be supplied in cells containing electrolyte liquid while in reserve and put into service by insertion of one or both electrodes. Liquid activated cells as heretofore constructed, however, have generally been subject to the serious disadvantage of slow activation.

In accordance with the present invention this disadvantage is removed. In its preferred form the invention comprises a tubular zinc electrode containing a depolarizing mix and a granular paste-forming material, each characterized by a high degree of permeability to liquid. The tubular zinc electrode is closed at the top by a sealing compound, and at the bottom by a cup adapted to be removed to introduce the activating liquid.

The invention will be described in detail in connection with the accompanying drawing, in which—

Fig. 1 is a vertical central section through the improved cell in inactive condition, and Fig. 2 is a similar view, showing a modified form of bottom cup.

Referring to Fig. 1, numeral 1 denotes a zinc tube, serving as the anode of the cell, and telescoping within a cup 2. The frictional engagement between the tube and cup may hold them together, or any suitable securing means may be adopted. In the embodiment illustrated, cup 2 will be made of zinc, or other conductive material, to permit the base of the cell to be used as one terminal, but binding posts may obviously be provided, and in such case the cup may be made of suitable non-conducting material. If a metal cup is used, an insulating disc 2' will be fitted in its base.

The upper end of the zinc tube 1 is closed by a waterproofed cardboard disc 3, centrally perforated to permit the passage of carbon rod 4, and supporting a composite seal in which the end of the carbon rod is embedded. The lower layer 5 of the seal is composed of a relatively soft material adapted to make a fluid tight joint with both the zinc tube and the carbon rod. The upper layer 6 consists of a material sufficiently rigid, under all ordinary temperature conditions, to hold the carbon rod firmly in place. Various plasticisable substances may be used in making the seals. We find that soft pitch is excellent for the sub-seal 5 and the well-known red sealing composition, comprising rosin, silica, talc, and coloring matter, may be used with advantage for the upper layer 6. The carbon rod 4 is surrounded by a depolarizing composition 7 protected from disintegration by any desired surface covering, such as a wrapping of fabric 8. A chamber 9 is provided at the bottom of the cell and receives gases evolved or paste exuded during service.

When the cathode and seals have been assembled as described, the cell is preferably inverted and a dry, granular, paste-forming material 10 is filled into the annular space between the mix and zinc. The paste-forming material may be any of those described in the application of R. C. Benner and H. F. French, filed Feb. 5, 1920, Serial No. 356,496, or equivalent material. A typical composition which may be used with advantage comprises flour dough and a zinc chlorid-ammonium chlorid double salt, both the dough and salt being in dry, granular condition, and in approximately equal parts by weight. A composition of this sort, if properly subdivided, permits the rapid percolation of the activating liquid and the cell is capable of giving full service without appreciable delay. We have discovered that the size of the granules is important, especially in small cells for flashlights or the like, and that the best results are obtained with dried dough granules of about the size which will pass through a 14 mesh screen and be retained by a 35 mesh screen. The salt granules should in general pass through a 35 mesh screen and be retained by a 70 mesh screen. If the granules are finer, water does not in general penetrate with the desired rapidity, and if coarser, voids may remain after gelatinization of the paste-forming material.

A collar 11 of stiff gauze or blotting paper is fitted tightly in the zinc tube 1 to retain the granular material 10 in position. The cup 2 is telescoped upon tube 1 and the cell is ready for storage or shipment.

To activate the cell, the cup 2 is removed, the cell is inverted, and activating liquid is poured into chamber 9. The activation, for all practical purposes, may be considered instantaneous. From one to two minutes only is required. We prefer to make the cup 2 of such size as to hold exactly the required quantity of liquid or to provide a larger or smaller cup with a suitable indication of its proper use as a measure. The provision of an end closure serving to measure the liquid to be added is of material aid in preventing faulty activation through addition of too much or too little liquid. Electrolyte salts may be incorporated in the mix or associated with the paste-forming material in the manner described above, or in any other suitable manner, in which case water only need be added. If such salts are not present in the cell, they may be dissolved in the activating liquid.

When a still more rapid activation is desired, and the depolarizing mix contains electrolyte salts, it may be made up with alcohol or other non-aqueous liquid to prevent the formation of a cementing precipitate of such salts and to insure its permeability, as described in the application of G. W. Heise and C. W. Brokate, filed Nov. 15, 1921, Serial No. 515,366. The carbon rod may also be provided with a central bore and lateral perforations to facilitate liquid distribution.

In the form of the invention shown in Fig. 2, the construction is the same as that previously described, except that a cup 12 is adapted to fit within the zinc tube 1. The projecting end of carbon rod 4 prevents the cup from moving too far within the tube. The cup 12 preferably extends somewhat beyond tube 1, so that the cup may be readily grasped for removal.

We make no claim to the granular paste-forming material broadly, the permeable depolarizing mix, or the composite seal, per se. Our invention resides in the combination of one or more of these elements, or their equivalents, with a cell structure adapted to secure a maximum of utility therefrom, and is so defined in the appended claims.

We claim:—

1. A dry cell comprising a container, a material therein capable of rapidly absorbing excitant liquid, and a cup adapted to serve as a measure for said liquid and as a bottom closure for the cell.

2. A dry cell comprising a metallic container, a seal in one end of said container and supporting a carbon rod, a depolarizing composition and paste-forming material within said electrode, and a closure upon the other end of the container and adapted to be removed to permit introduction of activating liquid into the cell.

3. A dry cell comprising a metallic container electrode, a cathode and depolarizing mix therein, a dry, granular paste-forming material between said mix and container electrode, means for retaining said material in position, and a cup removably secured to said container electrode and adapted to serve as a measure for activating liquid to be added to said paste-forming material.

4. A dry cell comprising a metallic container electrode, a cathode and depolarizing mix containing electrolyte salts therein, said mix being characterized by the absence of a cementing precipitate of such salts and by a high degree of permeability, a dry, granular paste-forming material between said mix and container electrode, means for retaining said material in position, and a cup removably secured to said container electrode and adapted to serve as a measure for activating fluid to be added to said paste-forming material and depolarizing mix.

5. A dry cell of the liquid activated type comprising a metallic container electrode, a bottom closure for said container electrode adapted to be removed to permit introduction of liquid into said cell, a carbon rod, and a top closure comprising a composite seal in which one end of the carbon rod is embedded, said seal having one layer of sufficient strength and rigidity to maintain the rod in position, and a second layer of soft material adapted to make a liquid tight joint with said container electrode and carbon rod, whereby loss of activating liquid is prevented.

6. A dry cell of the miniature type comprising a metallic container, a cathode and depolarizer therein, a dry paste-forming material between said depolarizer and container, said material consisting of granules of about the size which will pass through a 14 mesh screen and be retained by a 35 mesh screen, and means for permitting the introduction of liquid into said sell.

7. The invention according to claim 6, in which an electrolyte salt, in granules of about the size which will pass through a 35 mesh screen and be retained by a 70 mesh screen, is associated with the paste-forming material.

In testimony whereof, we affix our signatures.

RAYMOND C. BENNER.
HARRY H. THOMPSON.